United States Patent

[11] 3,579,076

| [72] | Inventors | John A. Herbst<br>Morristown;<br>Victor H. Seliger, North Caldwell, N.J. |
|---|---|---|
| [21] | Appl. No. | 787,940 |
| [22] | Filed | Dec. 30, 1968 |
| [45] | Patented | May 18, 1971 |
| [73] | Assignee | Singer-General Precision, Inc.<br>Little Falls, N.J. |

[54] CHARGE CONTROL SYSTEM FOR BATTERIES
16 Claims, 2 Drawing Figs.

[52] U.S. Cl. ............................................. 320/36,
320/24, 320/40
[51] Int. Cl. ............................................. H02j 7/04
[50] Field of Search ............................................. 380/20,
21—24, 35.36, 39, 40, 9, 10

[56] References Cited
UNITED STATES PATENTS

| 2,967,988 | 1/1961 | Seright .......................... | 320/36 |
| 3,106,665 | 10/1963 | Byles ............................ | 320/35UX |
| 3,296,516 | 1/1967 | Paine et al. ................... | 320/35 |
| 3,387,199 | 6/1968 | Billerbeck, Jr. et al. ....... | 320/35X |

*Primary Examiner*—James D. Trammell
*Assistant Examiner*—John M. Gunther
*Attorneys*—S. A. Giarratana, G. B. Oujevolk and S. M. Bender

ABSTRACT: A battery charging system including means for connecting a voltage source to the battery in a manner to establish a high current path and a low current path through the battery, and a switching means connected in said paths and responsive to various battery temperatures for providing an open circuit in one or more of the paths.

Patented May 18, 1971

INVENTORS
JOHN A. HERBST
VICTOR H. SELIGER
BY

ATTORNEYS

INVENTORS
JOHN A. HERBST
VICTOR H. SELIGER 3,579,076

CHARGE CONTROL SYSTEM FOR BATTERIES

BACKGROUND OF THE INVENTION

The invention herein described was made in the course of, or under, a contract, or subcontract thereunder, with the Department of the Navy.

The invention relates to a charging system for a battery and, more particularly, to such a system for controlling a high and low rate of charge through the battery.

In many systems utilizing a battery as a primary or alternate source of electrical energy, it is essential that the battery be maintained in a fully charged condition. For example, in the use of inertial guidance systems, or the like, a battery is connected between a source of AC voltage and the particular components of the system to insure that the battery will supply electrical energy to the system in the event there is a power failure. Thus, the battery should be maintained in a fully charged condition at all times.

Several types of systems have been proposed for keeping a battery in a fully charged condition. For example, it has been proposed to provide a simple low current or trickle charge through the battery, the charge being low enough so that the battery can absorb it without damage. However, in the case of high usage caused by the frequent, short time power outages, the battery may become completely discharged and therefore rendered useless.

Another system that has been proposed includes a means for monitoring the battery terminal voltage, since the latter rises slowly during charge and more rapidly when the charging has been completed; and governing the amount of charge to the battery in response to this monitoring. However, the voltage varies nonlinearly with temperature, and the rise of voltage at the completion of the charge is very small at high temperatures, making detection of the full charge point uncertain.

It also has been proposed to measure the ampere-hours used during a power outage by some form of coulometer so that the equivalent ampere-hours might be replaced as soon as prime power becomes available. However, this system fails under exposure of the battery to ambient temperatures of a magnitude which causes the cells to self-discharge, since the loss of energy is not recorded by the coulometer. This latter system will therefore require some additional means to prevent the accumulation of even small amounts of self-discharge from allowing the battery to become discharged.

SUMMARY OF THE INVENTION

It is therefore an object of the present invention to provide a battery charging system which senses the battery temperature in general, and relative temperatures between various cells of the battery, and controls the flow of the high charge current and low charge current accordingly.

Briefly summarized, the battery charging system of the present invention comprises a voltage source, means for connecting said voltage source to said battery to establish a current path through said battery, and switching means connected in said path and responsive to the temperature of at least one active battery cell exceeding a temperature external to said active cell for providing an open circuit in said latter path.

BRIEF DESCRIPTION OF THE DRAWINGS

Reference is now made to the accompanying drawings for a better understanding of the nature and objects of the battery charging system of the present invention, which drawings illustrate the best mode presently contemplated for carrying out the objects of the invention and its principles, and are not to be construed as restrictions or limitations on its scope.

In the drawings.

DESCRIPTION OF THE PREFERRED EMBODIMENTS

Figure 1:
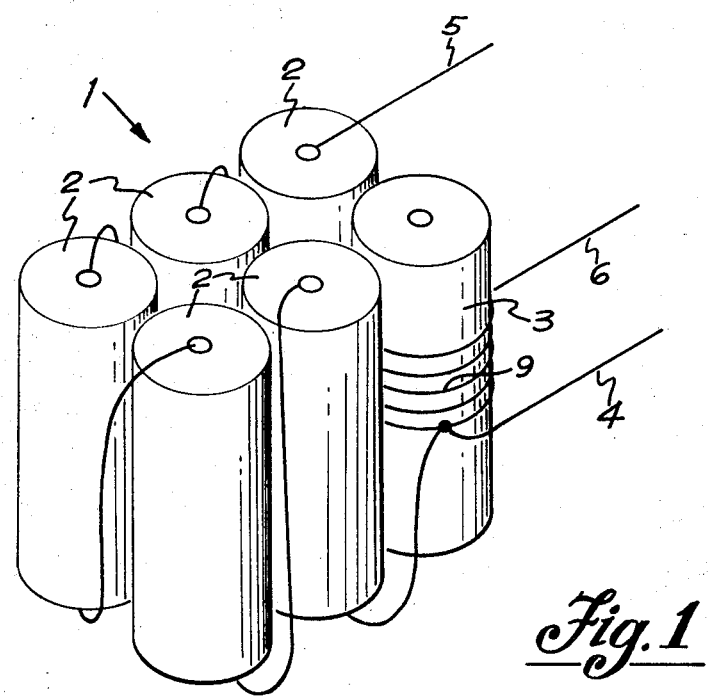
FIG. 1 is a perspective view of a typical battery connected in accordance with the present invention.

Referring specifically to FIG. 1 of the drawings, a battery 1 is shown which consists of a plurality of active cells 2 and a passive cell 3 arranged in a conventional manner. The active cells 2 are connected in series between a charge line 4 and a common line 5, and a discharge line 6 is connected to the charge line 4 through a heating wire 9 wrapped around the passive cell 3 to heat same in a manner that will be described in detail later.

A pair of thermistors (not shown) are mounted on the battery in any convenient place, such as to a pair of the active cells, to sense the battery temperature. Additional thermistors are mounted in three of the active cells 2 and the passive cell 3 to sense the temperatures of these cells.

Figure 2:
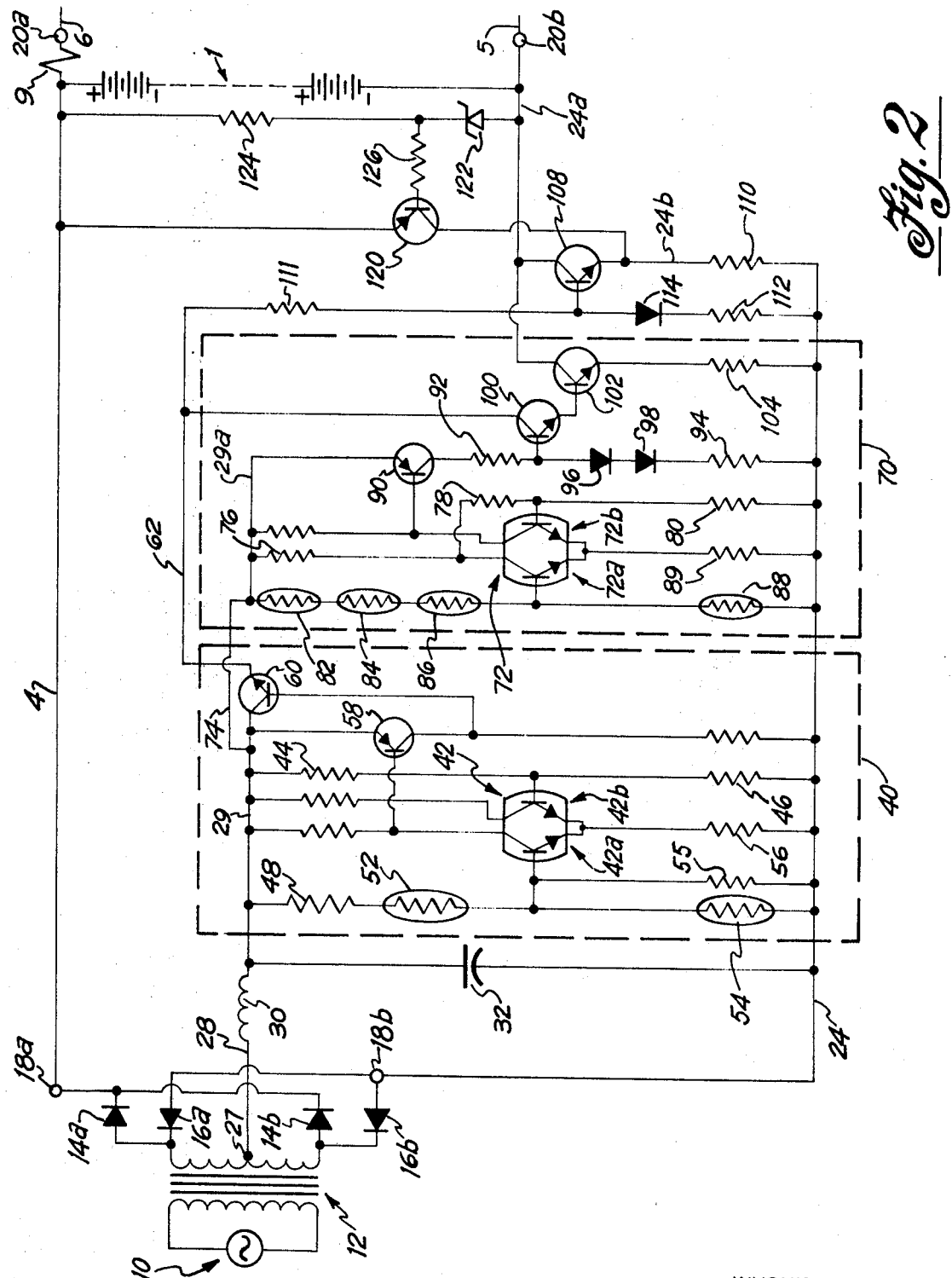
FIG. 2 is a circuit diagram depicting the battery charging system of the present invention.

A circuit diagram of the system of the present invention is shown in FIG. 2 of the drawings, and includes a source of alternating current 10 connected to a transformer 12 which reduces the source voltage to a predetermined value. The output of the transformer 12 is connected to a pair of diodes 14a and 14b, and to a pair of diodes 16a and 16b to produce direct current across a pair of direct current terminals 18a and 18b. The charge line 4 connects the terminal 18a to the positive side of the battery 1, and the terminal 18b is connected through the conductors 24 and 24a and the charging control circuitry to the negative side of the battery 1. The common line 5 and the discharge line 6 are connected to the terminals 20b and 20a, respectively, to form a discharge path which extends from the battery, through the heating wire 9, the terminal 20a and the discharge line 6; and back through the common line 5 and the terminal 20b.

A conductor 28 is connected to a tap 27 on the output winding of the transformer 12 at a predetermined position to produce a voltage lower than the voltage made available between the input terminals 18a and 18b. An inductor 30 and a capacitor 32 are connected between the tap 27 and the conductor 24 to filter the direct current flowing in this latter circuit. A filtered DC voltage is thus provided between a conductor 29, which is connected to the junction between the capacitor 32 and the inductor 30, and the conductor 24.

A pair of switching circuits, shown generally at 40 and 70 are provided, which circuits are energized by the filtered DC voltage and control the flow of current from the input terminals 18a and 18b through the battery 1, as is described below in detail.

The switching circuit 40 features the use of a dual transistor amplifier 42 connected between the conductors 24 and 29 and consisting essentially of a pair of NPN transistors 42a and 42b. The base of the transistor 42b is maintained at a fixed potential with respect to ground by means of a pair of resistors 44 and 46 which are connected between the conductors 24 and 29 to act as a voltage divider. A network consisting of thermistors 52 and 54 and resistors 48 and 55 is also connected between the conductors 24 and 29. The junction between the thermistors 52 and 54 is connected to the base of the transistor 42a to control the conductivity thereof. The thermistors 52 and 54 are the ones mounted on the battery 1 to sense the temperature thereof.

The switching circuit 40 is responsive to the temperature of the battery as sensed by the thermistors 52 and 54, and by proper choice of the values of the resistors 48 and 55, detects when this temperature falls out of a predetermined range, such as 0°—50° C., for example, for a nickel cadmium battery. When the battery temperature is within the selected range, the thermistors 52 and 54 in combination with the resistors 48 and 55, maintain the base of the transistor 42a at a higher potential with respect to ground than the base of the transistor 42b. The transistor 42b transmits the voltage applied to its base across a resistor 56 connected between the conductor 24 and the emitters of the dual transistor 42. Accordingly, the transistor 42a will be turned on when the voltage at its base is above the voltage at the base of the transistor 42b and is turned on when the battery temperature is between 0°—50° C.

The collector of the transistor 42a is connected to the base of a PNP transistor amplifier 58, which, in turn, has its collector connected to the base of an NPN switching transistor 60. When the transistor 42a is turned on, the switching transistor 60 is switched on via the amplifier 58 and the transistor 60 permits the current from the filtered DC voltage source to pass through to a conductor 62. Thus, whenever the battery temperature is between 0° C. and 50° C., the filtered DC voltage is applied to conductor 62.

If the battery temperature falls below the predetermined temperature, which in this example is 0° C., the thermistor 52 becomes so high in resistance that the potential of the base of the transistor 42a drops below that of the base of the transistor 42b, and therefore the transistor 42a is turned off. On the other hand, if the temperature rises above a predetermined temperature suitable for the particular battery in use, which in this example is 50° C., the resistance of the thermistor 54 will become so low that the potential at the base of the transistor 42a will drop below that applied to the base of the transistor 42b thus turning the transistor 42a off. Upon the transistor 42a being turned off in either of the above manners, the amplifier 58 and the switching transistor 60 are also turned off, resulting in the cutting off of current flow to the conductor 62.

The switching circuit 70 is in the form of a Schmitt trigger circuit and features the use of a dual transistor Schmitt trigger 72 connected between the conductor 24 and a conductor 29a, the latter in turn being connected to the conductor 29 by means of a connector 74. The trigger 72 consists essentially of two NPN transistors 72a and 72b, and a voltage divider network in the form of resistors 76, 78, and 80 is provided to maintain the potential of the base of the transistor 72b normally at a value slightly more than one-fourth of the filtered DC voltage between conductors 24 and 29a. Thermistors 82, 84, 86, and 88 are connected in series between the conductors 29a and 24. The thermistors 82, 84, and 86 are the thermistors mounted in three of the active cells 2 of the battery 1 to sense the temperature thereof, and the thermistor 88 is mounted in the passive cell 3 to sense the temperature thereof. The junction between the thermistors 86 and 88 is connected to the base of the transistor 72a to maintain the base of this transistor at a potential slightly below that of the base of the transistor 72b when the thermistors 82, 84, 86, and 88 have equal resistances. When the base of the transistor 72b is at a higher potential than the base of the transistor 72a, current will flow through the base-emitter junction of the transistor 72b and through a resistor 89 connected from the emitters of the transistors 72a and 72b to the conductor 24, thus turning the transistor 72b on.

A PNP switching transistor 90 has its base connected to the collector of the transistor 72b, and when the latter is turned on, the transistor 90 is switched on causing current to pass from the conductor 29a through the transistor 90 and through a voltage dividing network in series with the transistor 90, and comprising a pair of resistors 92 and 94 and a pair of diodes 96 and 98.

The base of an NPN transistor 100 is connected to the junction between the resistor 92 and the diode 96, and its collector is connected to conductor 62. An NPN transistor 102 has its base connected to the emitter of the transistor 100, its collector connected to the conductor 24a and its emitter connected to the conductor 24. A resistor 104, of a relatively low value, is placed in series with the emitter of the transistor 102.

Upon the switching transistor 90 being turned on as described above, the current flowing through the transistor 90, the resistors 92 and 94 and the diodes 96 and 98, applies a potential to the bases of transistors 100 and 102 to turn them on. Assuming the temperature of the battery is within the predetermined range as discussed above, resulting in the switching transistor 60 being turned on and causing the DC potential on conductor 29 to be applied to the conductor 62, and that the transistor 72a is turned off and the transistor 72b is turned on, a high charge current from the input terminal 18a will flow through the conductor 4, the battery 1, the conductor 24a, the transistor 102, the relatively low valued resistor 104, and the conductor 24 to the input terminal 18b. The switching circuit 70 will be in this condition when the resistances of the thermistors 82, 84, 86, and 88 are equal as a result of the temperature in the active cells 2 comprising the battery 1 having the same temperature as the passive cell 3.

When the temperature of any of the active cells becomes greater than that of the passive cell in response to the particular active cell becoming fully charged, the resistance of the thermistor mounted in that particular cell will decrease, causing the potential at the base of the transistors 72a to rise above that applied to its emitter, and current to flow through the base-emitter junction of the latter, and into the resistor 89, thus turning the transistor 72a on, and the transistor 72b off. This action, in turn, switches off the switching transistor 90 and therefore the transistors 100 and 102, thereby cutting off the high charge current flow. In this manner, the high charge current is cut off from the battery in response to the temperature of one of the active cells of the battery rising above the temperature of the passive cell 3 as it will when the former becomes fully charged. Of course, normally all cells become charged at the same time, although one may lead slightly. The three thermistors assure that if one cell should lag, the effect will be small. Usually each of the three thermistors make one-third the change necessary to trip the Schmitt trigger.

An NPN transistor 108 has its emitter connected to the conductor 24 through a resistor 110 and its collector connected to the conductor 24a. The base of the transistor 108 is connected to the conductor 62 through a resistor 111 and to the conductor 24 through a resistor 112 and a diode 114. This transistor is turned on whenever a DC voltage is applied to the conductor 62 and provides, through resistor 110, an additional path for current flow to charge the battery 1 from the conductors 4 and 24. Since the resistor 110 is selected to have a high value, a current of low magnitude will be applied to the battery to provide a trickle charge.

The switching circuit 40 exerts a primary control over the flow of both high and trickle charge current through the battery 26. When the transistor 42a is turned on as described above, DC voltage is applied to the conductor 62, which permits the transistor 108 to be turned on and a trickle charge current to therefore pass through the high resistance 110. Also, current flows from the conductor 62 through the transistor 100 to enable the transistor 102 to be turned on, so that high charge current may be applied to the battery. On the other hand, if the transistor 42a of the switching circuit 40 is turned off, the flow of both the high charge current and the trickle charge current will be cut off, since DC power will be removed from the conductors 62 by the switching transistor 60. Thus the Schmitt trigger circuit 70 controls the flow of the high charge current through the battery 1 only if the switching circuit 40 determines that the battery temperature is within the selected range, e.g. 0° to 50° C.

The resistor 78 connects the base of the transistor 72b to the collector of the transistor 72a to provide a Schmitt trigger circuit so that, even though the resistances of the thermistors 82, 84, and 86 may rise back up to their normal value due to a decrease in the temperature of their associated cells, thus causing a corresponding decrease in the potential of the base of the transistor 72a, the transistor 72b will stay turned off. When the transistor 72a is turned on, the drop in potential at the collector thereof is transmitted to the base of the transistor 72b to provide a regenerative effect to switch the transistor 72a fully on and maintain it on even though the potential at the base of the transistor drops back down to its normal value. This hysteresis effect prevents the Schmitt trigger from resetting when the thermistors 82, 84, 86, and 88 return to a uniform temperature. Thus, the resetting of the Schmitt trigger circuit 70 can only occur upon removal of the voltage source 10. When the source 10 is restored after removal, the collector supply voltage to the transistor 72a is reinstated, the Schmitt trigger circuit 70 operates in the normal mode and the high charge current is reinstated and terminated by the temperature differential, as described above.

The circuit described includes means to control the magnitude of the high charge current and the trickle current. The trickle current passing through the resistor 110 will be maintained at a value to make the voltage at the emitter of the transistor 108 just below the voltage developed by the resistor 112 and the diode 114. The variation in temperature of the transistor 108 is compensated for by the presence of the diode 114 in series with the resistor 112.

The high charge current flow of current through the resistor 104 is controlled in the same manner. This current will be maintained at a value to make the voltage at the emitter of the transistor 102 just below the voltage developed across the resistor 94 and the diodes 96 and 98. Also, as in the previous arrangement, the diodes 96 and 98 compensate for any temperature variation in the transistors 100 and 102.

A PNP transistor 120 is connected between the conductor 4 and the emitter of the transistor 108, and operates in response to the condition of a Zener diode 122 to cut the trickle charge in case the battery voltage exceeds a value that could cause gassing. The Zener diode 122 and a resistor 124 are connected in series between the conductors 4 and 24a and their junction is connected to the base of the transistor 120 through a resistor 126. When the battery voltage exceeds the critical value, the Zener diode 122 breaks down and conducts. The voltage drop across the resistor 124 caused by the resulting excess current flow through the resistor 124 biases the transistor 120 on. The collector current from the latter flows through the resistance 110 and biases the transistor 108 off, thus effectively cutting off the trickle current from the battery.

The heating wire 9, electrically connected between the battery 1 and the output terminal 20a and wrapped around the passive cell 3, as shown in FIG. 1, serves to heat the passive cell to the same degree that the active cells are heated by the discharge current of the battery 1, so that the temperature of the passive cell will rise the same amount as the temperature of the active cells when the battery is discharged at relatively high rates. Thus, the temperature sensing made possible by the Schmitt trigger circuit 70 will not be distorted because of high battery discharge current.

The above-described system, including the battery, can be connected between a source of AC power and an external system requiring an uninterrupted source of electrical energy, so that, in the event of power failure, the battery would be able to supply the required energy.

In the above description, only the basic electrical components necessary for a complete understanding of the system have been described. Undescribed components, such as the resistors shown without reference numerals in FIG. 2, have obvious functions in the circuits disclosed.

Several variations and additions to the above circuits can be made within the scope of the invention. For example, a resistor could be connected between the collector of the transistor 42b and the base of the transistor 42a in the switching circuit 40 to provide a hysteresis effect similar to that described in connection with the differential amplifier 72. With this modification, once the transistor 42a turns off in response to the battery temperature falling outside of the selected range, it will stay turned off, maintaining the transistor 60 switched off, even though the battery temperature later returns to within the selected range. Also, a different connection can be made between conductor 29 and the conductor 29a than provided by the connector 74. For example, the conductor 29a could be connected to the conductor 62 instead of the conductor 29, in which case the collector voltage for the Schmitt trigger is removed whenever the battery temperature is outside the selected range as sensed by the thermistors 52 and 54. This could be an advantage if prolonged exposure to high temperatures were expected, which exposure could cause serious amounts of self-discharge since the high charge current would be initiated on the return of the battery temperature to the selected range.

Of course, other variations of the specific construction and arrangement of the battery charging system disclosed above can be made by those skilled in the art without departing from the invention as defined in the appended claims.

We claim:

1. A charging system for a battery comprising a voltage source, means for connecting said voltage source to said battery to establish a current path for charging said battery from said voltage source, temperature sensing means responsive to said battery attaining a fully charged condition for providing a corresponding output signal, and switching means connected in said current path responsive to said output signal for providing an open circuit in said current path, wherein said sensing means is responsive to the temperature of said battery exceeding a temperature external to said battery independently of ambient temperature changes.

2. The system of claim 1 wherein said sensing means is additionally independent of changes in battery temperature due to useful discharge of current from said battery.

3. The system of claim 1 wherein the battery includes a passive cell and wherein said temperature external to said active cell is the temperature of said passive cell.

4. The system of claim 3 wherein said sensing means includes heater means, said heater means having a first portion electrically connected to the discharge lead of said battery and having a second portion thermally connected to said passive cell so that said sensing means is responsive to the temperature of an active cell of said battery exceeding the temperature of said passive cell independently of increase in the temperature of said active cell due to current discharge.

5. The system of claim 4 wherein said sensing means includes a first thermistor for sensing the temperature of said active cell of said battery, and a second thermistor for sensing the temperature of said passive cell of said battery, and wherein said switching means includes a switching transistor circuit responsive to changes in relative resistance of said thermistors for switching on and off.

6. The system of claim 1 wherein said switching means establishes an additional current path providing a relatively low charging current for said battery.

7. The system of claim 6 wherein said connecting means includes a high charge transistor circuit for said high charging current and a low charge transistor circuit for said low charging current.

8. A charging system for a battery comprising a voltage source, means for connecting said voltage source to said battery to establish a current path for charging said battery from said voltage source, temperature sensing means responsive to said battery attaining a fully charged condition for providing a corresponding output signal, and switching means connected in said current path responsive to said output signal for providing an open circuit in said current path, wherein said sensing means is arranged for sensing the absolute battery temperature, said sensing means being responsive to said battery temperature falling out of a predetermined range and being operative for providing a corresponding output signal, and wherein said switching means connected in said current path is responsive to said latter output signal for providing an open circuit in said current path.

9. The system of claim 8, wherein said sensing means is responsive to the temperature of said battery exceeding a temperature external to said battery independently of ambient temperature changes.

10. The system of claim 9, wherein said sensing means is additionally independent of changes in battery temperature due to useful discharge of current from said battery.

11. The system of claim 10, wherein said switching means is arranged for maintaining said open circuit until subsequent discharge of energy from said battery.

12. The system of claim 11, wherein the battery includes a passive cell and wherein said temperature external to said active cell is the temperature of said passive cell.

13. The system of claim 12, wherein said sensing means includes heater means electrically connected to the discharge lead of said battery and thermally connected to said passive cell so that said sensing means is responsive to the temperature of an active cell of said battery exceeding a temperature external to said active cell independently of increase in the temperature of said active cell due to current discharge.

14. The system of claim 13, wherein said sensing means includes a thermistor for sensing the temperature of said active cell of said battery, and a thermistor for sensing the temperature of said passive cell of said battery, and wherein said switching means includes a switching transistor circuit responsive to changes in relative resistance of said transistors.

15. The system of claim 14, wherein said switching means establishes an additional current path providing a relatively low charging current for said battery.

16. The system of claim 15, wherein said connecting means includes a high charge transistor circuit for said high charging current and a low charge transistor circuit for said low charging current.